(12) United States Patent
Shveidel et al.

(10) Patent No.: US 12,737,291 B2
(45) Date of Patent: Sep. 15, 2026

(54) MANAGING REFERENCE COUNTS OF VIRTUAL BLOCKS

(71) Applicant: Dell Products L.P., Round Rock, TX (US)

(72) Inventors: Vladimir Shveidel, Pardes Hana-Karkur (IL); Uri Shabi, Tel Mond (IL)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 18/920,392

(22) Filed: Oct. 18, 2024

(65) Prior Publication Data

US 2026/0111361 A1 Apr. 23, 2026

(51) Int. Cl.
*G06F 12/08* (2016.01)

(52) U.S. Cl.
CPC .................................... *G06F 12/08* (2013.01)

(58) Field of Classification Search
CPC ............. G06F 12/0804; G06F 12/0864; G06F 12/0868; G06F 12/0871; G06F 12/0897; G06F 12/0246; G06F 12/0253
USPC .................. 711/154, 103, 114, 112, E12.078
See application file for complete search history.

(56) References Cited

U.S. PATENT DOCUMENTS 4,775,932 A * 10/1988 Oxley ................. G06F 12/0253
9,442,941 B1 * 9/2016 Luz ......................... G06F 3/061
2018/0004668 A1 * 1/2018 Azizi .................... G06F 3/0608
2021/0011667 A1 * 1/2021 Soukhman ............ G06F 3/0652
2022/0391118 A1 * 12/2022 Mayo .................... G06F 3/0604
2023/0384943 A1 11/2023 Dovzhenko et al.

OTHER PUBLICATIONS

Derzhavetz, Jenny, et al.; "Processing Metadata Changes Using Multiple Aggregation Policies," U.S. Appl. No. 18/494,196, filed Oct. 25, 2023.
Shveidel, Vladimir, et al.; "Destaging Metadata Changes Using Read Locks," U.S. Appl. No. 18/414,632, filed Jan. 17, 2024.
Shveidel, Vladimir, et al.; "Managing Decref Processing From Tablets Containing Sorted Buckets," U.S. Appl. No. 18/644,361, filed Apr. 24, 2024.

* cited by examiner

*Primary Examiner* — Jared I Rutz
*Assistant Examiner* — Edward Waddy, Jr.
(74) *Attorney, Agent, or Firm* — BainwoodHuang

(57) ABSTRACT

A technique of managing reference counts of virtual blocks includes providing a virtual block having a fixed-length reference-count field configured to store a reference count, the reference count indicating a number of pointers that point to the virtual block. The technique further includes creating an incref (reference-count increment) directed to the virtual block and, in response to the incref causing the reference count of the virtual block to increase to a threshold value, performing an update operation, the update operation including writing the threshold value to an expansion region separate from the virtual block and storing a code in the reference-count field. The code indicates that an actual reference count of the virtual block is stored in the expansion region.

20 Claims, 4 Drawing Sheets

Figures 6, 7:
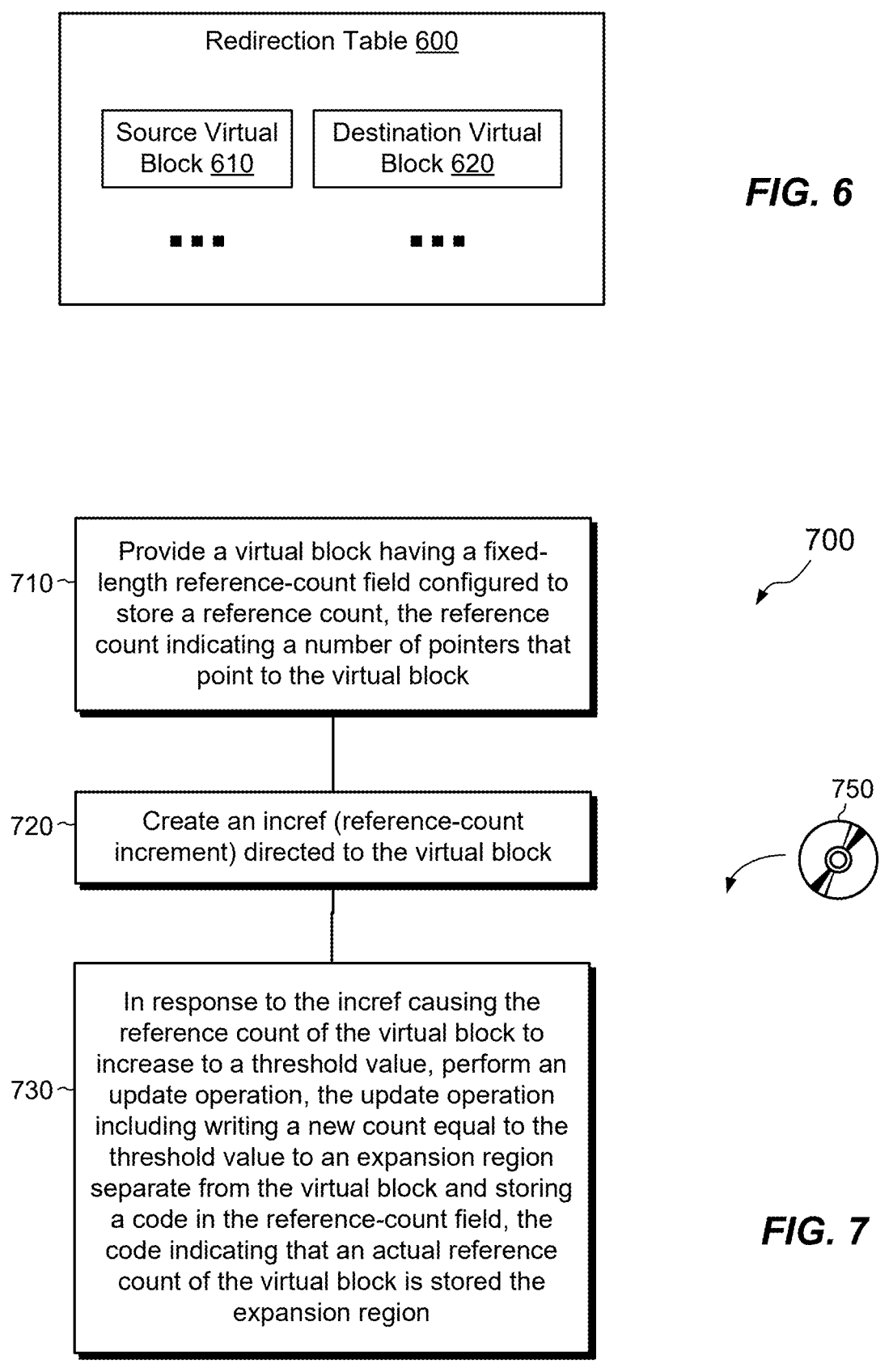

Redirection Table 600

Source Virtual Block 610

Destination Virtual Block 620

710 Provide a virtual block having a fixed-length reference-count field configured to store a reference count, the reference count indicating a number of pointers that point to the virtual block 720 Create an incref (reference-count increment) directed to the virtual block 730 In response to the incref causing the reference count of the virtual block to increase to a threshold value, perform an update operation, the update operation including writing a new count equal to the threshold value to an expansion region separate from the virtual block and storing a code in the reference-count field, the code indicating that an actual reference count of the virtual block is stored the expansion region

MANAGING REFERENCE COUNTS OF VIRTUAL BLOCKS

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Some storage systems provide virtual blocks for supporting deduplication and other block-sharing arrangements. For example, a storage system may arrange metadata that maps logical blocks to virtual blocks and metadata that maps virtual blocks to physical blocks in persistent storage. In cases where multiple logical blocks have identical data, the storage system may map such logical blocks to a single virtual block, such that the logical blocks share the same physical block. The virtual block stores a reference count that counts the number of logical blocks or other structures that point to that virtual block. The reference count may be stored in a field associated with the virtual block.

SUMMARY

Certain embodiments are directed to a method of managing reference counts of virtual blocks. The method includes providing a virtual block having a fixed-length reference-count field configured to store a reference count, the reference count indicating a number of pointers that point to the virtual block. The method further includes creating an incref (reference-count increment) directed to the virtual block and, in response to the incref causing the reference count of the virtual block to increase to a threshold value, performing an update operation, the update operation including writing the threshold value to an expansion region separate from the virtual block and storing a code in the reference-count field, the code indicating that an actual reference count of the virtual block is stored in the expansion region.

Other embodiments are directed to a computerized apparatus constructed and arranged to perform a method of managing reference counts of virtual blocks, such as the method described above. Still other embodiments are directed to a computer program product. The computer program product stores instructions which, when executed on control circuitry of a computerized apparatus, cause the computerized apparatus to perform a method of managing reference counts of virtual blocks, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

FIG. 6 is a block diagram of an example redirection table according to one or more embodiments.

FIG. 7 is a flowchart showing an example method of managing reference counts of virtual blocks, according to one or more embodiments.

DETAILED DESCRIPTION

Figure 1:
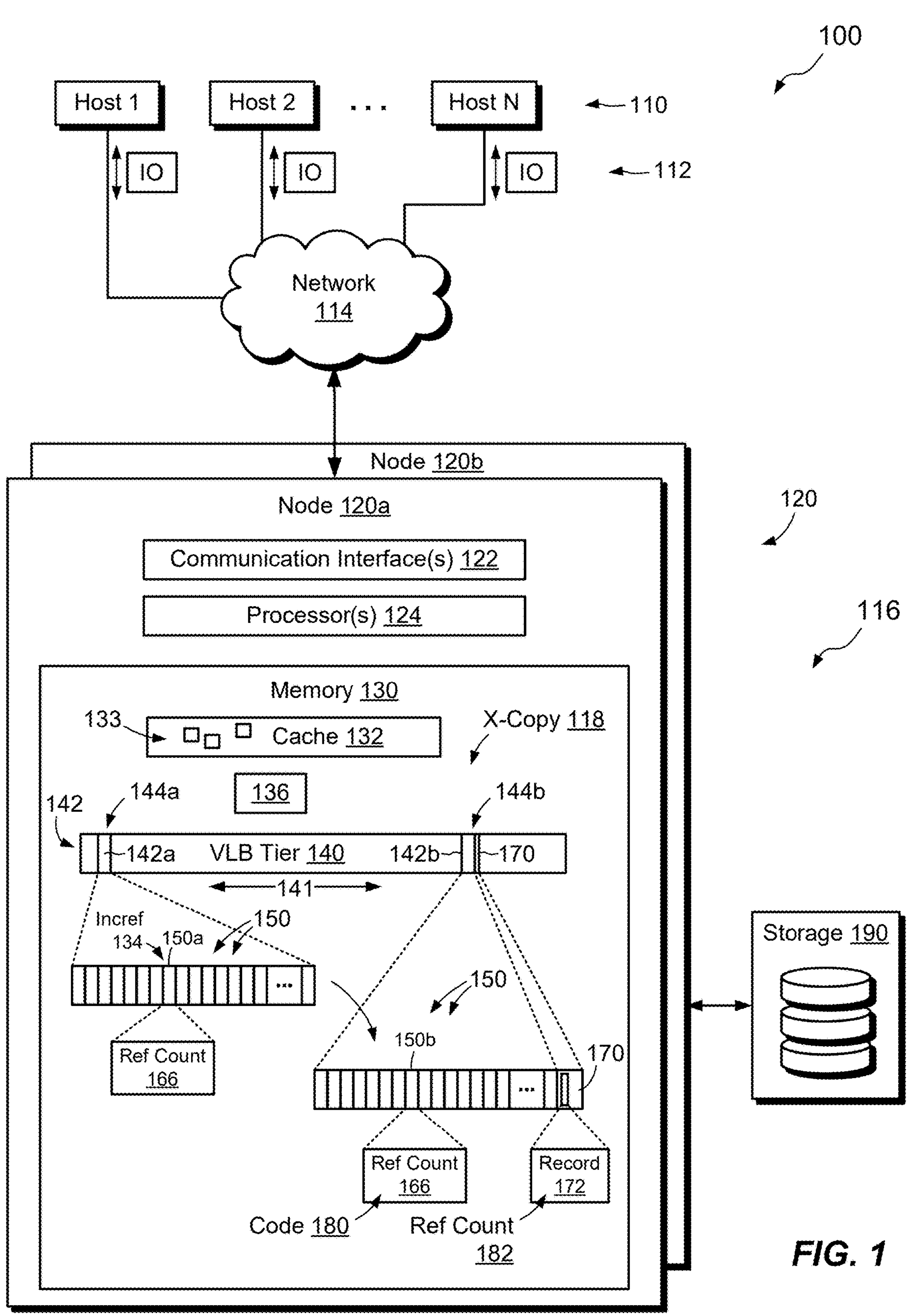
FIG. 1 is a block diagram of an example environment in which embodiments of the improved technique can be practiced.

A scenario can sometimes arise in which large numbers of duplicates of data objects are created in a storage system in a short period of time, resulting in many increments to reference counts ("increfs") of virtual blocks. Consider a storage system that backs an email server that receives 1,000 copies of a particular file. Rather than storing 1,000 unique copies of the file's data, the storage system may instead store a single copy, which is shared among 1,000 logical instances of the file. Behind the scenes, the storage system may apply 1,000 increfs to each virtual block of the file.

Reference counts are typically stored in fixed-length fields of virtual blocks, and scenarios such as the one described above can arise in which reference counts grow too large to fit in the fixed-length fields. One approach to managing these scenarios is to allow some number of duplicates to exist of a virtual block, where each duplicate has its own reference count. For example, allowing a single duplicate approximately doubles the maximum reference count that can be stored. But this approach creates complexity as well as additional metadata, which can degrade efficiency. Another approach is to interpret any reference count that has the maximum allowed value as an infinite reference count for the associated virtual block. In such cases, both increfs and decrefs (reference-count decrements) for the virtual block are ignored and accurate reference counting is abandoned. However, infinite reference counts are inefficient, as a virtual block with an infinite reference count (and its associated physical block) can never be reclaimed, resulting in a loss of storage capacity.

Both of the above approaches involve a further deficiency in that they entail updating reference counts of virtual blocks in cache, which is used for a variety of metadata types in addition to reference counts. For example, both approaches involve reading virtual blocks into cache to manage cases of block redirection, such as may occur during late deduplication. Also, allowing infinite reference counts as a practical matter involves reading virtual blocks into cache, so that reference counts can be accurately tracked prior to being assigned infinite status, thus ensuring that no more infinite reference counts are created than necessary. Further, changes in virtual blocks tend to repeat infrequently, with the effect being that loading virtual blocks into cache has a polluting effect on the cache, as other, more-frequently accessed metadata may have to be evicted from cache to make room for the virtual blocks. In addition, changing reference counts in cache involves reads from backend storage and complex locking, both of which can slow down operations. Such slowdowns are particularly noticeable when performing x-copies, i.e., metadata-only copies, which can take several seconds to complete due to the need to load affected virtual blocks into cache. What is needed, therefore, is a more efficient way of managing reference counts that are too large to fit in fixed-length reference-count fields.

The above need is addressed at least in part by an improved technique of managing reference counts of virtual blocks. The technique includes tracking a reference count of a virtual block in a fixed-length reference-count field, and upon detecting that a reference-count increment to the virtual block would cause the reference count to reach a threshold value, storing the threshold value in an expansion region separate from the virtual block and storing a code in the fixed-length reference-count field, The code indicates that an actual reference count for the virtual block is stored in the expansion region rather than in the reference-count field.

Advantageously, the improved technique accurately tracks reference counts whose values exceed the limits of fixed-length reference-count fields, avoiding the need for duplicates or infinite reference counts, and their associated disadvantages. The improved technique also enables reference counts of virtual blocks to be updated outside of cache, such as in system memory, avoiding cache pollution and improving overall efficiency, particularly for x-copies.

Embodiments of the improved technique will now be described. One should appreciate that such embodiments are provided by way of example to illustrate certain features and principles but are not intended to be limiting.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120*a* and node 120*b*), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Nonvolatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 190.

The depiction of node 120*a* is intended to be representative of all nodes 120. As shown, node 120*a* includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120*a*. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions.

When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a cache 132, a memory region 136 outside of cache 132, and a VLB (virtual large block) tier 140. The cache 132 is configured to store recently-accessed metadata pages 133, e.g., metadata pages that have been read from storage 190 and are held in cache 132 to provide fast access by applications running in the storage system 116. The memory region 136 is a portion of system memory or other volatile memory in which changes in metadata pages and other operations can be computed. The VLB tier 140 is an in-memory representation of a tier within storage 190 that is dedicated to storing metadata pages 142 that contain virtual blocks 150, such as a metadata page 142*a*. In an example, the VLB tier 140 is arranged as a linear array of persistent storage space, with each byte of the VLB tier 140 being addressable within an address space 141. As shown, metadata page 142*a* is disposed at a first persistent storage location 144*a* in the VLB tier 140, e.g., in a first range of addresses in the address space 141.

The metadata page 142*a* includes multiple virtual blocks 150, which may be organized in an array, for example. One such virtual block 150*a* includes various fields for storing metadata, such as a reference count field 166. The reference-count field 166 has a fixed-length, such as 8 bits, which implies values that range from 0 to 255. The reference-count field 166 may contain any number of bits, however.

In example operation, the data storage system 116 processes an instruction 118 to perform an x-copy operation. The x-copy operation 118 specifies a logical copy of a range of data and results in increfs to multiple virtual blocks 150, such as incref 134 to virtual block 150*a*.

If the reference count stored in the reference-count field 166 was already equal to 254 prior to issuance of the incref 134 (assuming an 8-bit reference-count field), then incrementing the reference count in field 166 would cause the new reference count to equal 255. According to one or more embodiments, the value 255 is defined as a threshold value. In an example, the threshold value is assigned as the maximum storable value in the reference-count field 266, although smaller values may be chosen for certain applications.

When the incref 134 causes the reference count to equal the threshold value, the node 120 responds by storing a code 180 in the reference-count field 266 and creating an expansion region 170 for storing an actual reference count 182 (e.g., 255). The code 180 may be the same as the threshold value (255), but it may alternatively be different. For example, if the threshold value is set to 250 instead of 255, then the code 180 could be any value between 250 and 255, inclusive. The presence of the code 180 in the reference-count field 266 acts as a signal to the node 120 that the actual reference count 182 for the virtual block 150*a* is stored in the expansion region 170 rather than in the reference-count field 266. As additional increfs arise for the same virtual block 150*a*, the reference-count field 266 continues to store the code 180, while the value in the expansion region 170 increases to reflect the additional increfs.

According to one or more embodiments, node 120 accommodates changes in the metadata page 142*a* resulting from the incref 134 by writing a modified version 142*b* of the page 142*a* along with the new expansion region 170 to a second persistent storage location 144*b*, which is distinct from the first persistent storage location 144*a*. The locations are "distinct" in that no portion of the range stored at the first location 144*a* (page 142*a*) overlaps with any portion of the range stored at the second location 144*b* (page 142*b* and the expansion region 170). The modified version 142*b* of the page 142*a* includes a modified version 150*b* of the virtual block 150*a*, i.e., a version that includes the code 180 (as well as any other changes in the page due to other activities). The original version 142*a* of the metadata page may be invalidated at or around this time.

Preferably, the new page 142*b* and the expansion region 170 are written adjacently in a single write operation, e.g., such that the expansion region 170 immediately follows the new page 142*b*. It is noted that it would not be feasible to provide the expansion region 170 if the metadata page 142*a* were updated in place instead of being written to the second location 144*b*, as the expansion region 170 would run into the space provided for an immediately-following metadata page 142. Writing to the second location 144*b* thus allows the expansion region 170 to be added. It also allows the expansion region 170 to have variable size. The metadata page that immediately follows the page 142*b* may be written immediately after the expansion region 170.

According to one or more embodiments, multiple expansion regions 170 may be provided on a per-page 142 basis and only if needed. Providing expansion regions 170 on a per-page basis enables virtual blocks 150 within a page 142 to have a fixed size. As one or more virtual blocks 150 within the same page 142 can have reference counts at or above the threshold value, the expansion region 170 may include one or more records 172. Each record 172 specifies the reference count of a respective virtual block 150 within the associated page 142.

According to one or more embodiments, updating the metadata page 142*a* and creating the expansion 170 are performed in the memory region 136, which is disposed outside of the cache 132. Therefore, the page 142*a* can be updated without loading the page into cache 132, which could cause cache pollution as well as incur significant delays. Although the simple example of FIG. 1 shows only a single incref 134 to a single virtual block 150*a* of a single metadata page 142*a*, the x-copy operation 118 can involve thousands of metadata pages 142, which if they were all loaded into cache could have significant detrimental effects on performance. The ability to update metadata pages 142 in memory region 136 outside of cache 132 thus results in significant improvements.

Recall that the need for loading pages into cache was partly to avoid infinite reference counts. But expansion regions 170 eliminate the need for infinite reference counts and thus partially enable metadata pages 142 to be updated outside of cache 132. The need for loading pages into cache was also for purposes of tracking redirections, which can arise, for example, in cases of late deduplication. This reason is also addressed according to one or more embodiments, as described further below in connection with FIG. 6. With both reasons for loading pages 142 into cache 132 thus addressed, it is no longer necessary to do so and page updates can be performed much more efficiently.

Figure 2:
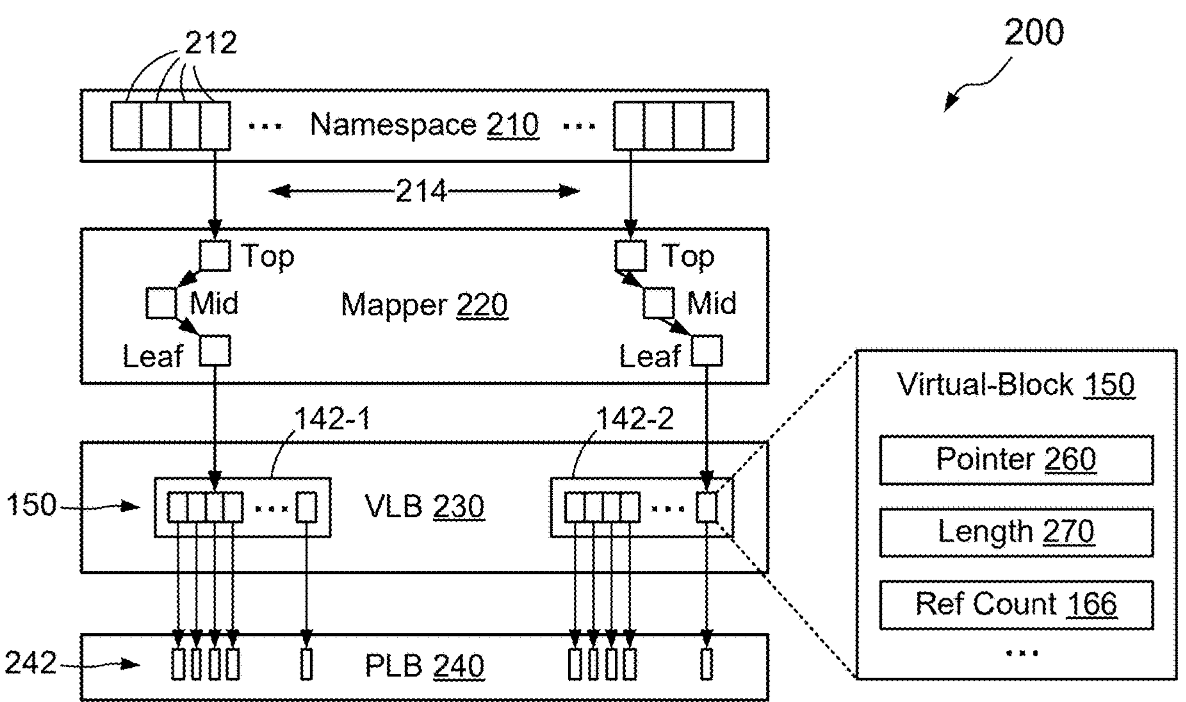
FIG. 2 is a block diagram of an example data path of a data storage system of FIG. 1, according to one or more embodiments.

FIG. 2 shows an example data path 200 for mapping data in the storage system 116 and provides an example context in which increfs and decrefs may arise according to one or more embodiments. The data path 200 provides a way of locating physical data blocks in storage 190 based on logical addresses. One should appreciate that data paths may be implemented in a variety of ways and that the example shown is intended to be illustrative rather than limiting.

As shown, the data path 200 includes a namespace 210, a mapper 220, a VLB (virtual large block) layer 230, and a PLB (physical large block) layer 240. The VLB layer 230 is a representation of portions of the VLB tier 140 shown in FIG. 1. The namespace 210 is configured to arrange logical data blocks 212 in a large logical address space 214. Data objects such as LUNs (Logical UNits), files systems, and virtual-machine disks may be provided within respective ranges of the namespace 220. No actual user data is stored in the namespace 210, however. Rather, the namespace 220 is a logical structure that points to rather than stores user data.

The mapper 220 includes trees of mapping pointers that map logical blocks 212 in the namespace 210 to respective virtual blocks 150 in the VLB layer 230. For example, the mapper 220 includes three layers of mapping pointers, shown here as tops, mids, and leaves. The role of the mapper 220 is to provide a pointer path from each allocated logical block 212 to a respective virtual block 150.

In the VLB layer 230, virtual blocks 150 reside within metadata pages 142, with two metadata pages 142-1 and 142-2 specifically shown. For example, over 100 virtual blocks 150 may be stored within each of the metadata pages 142-1 and 142-2.

An example virtual block 150 is shown to the right of FIG. 2. Here, the virtual block 150 has multiple fields, such as a pointer 260, a length 270, and the above-described reference-count field 166. Additional fields may be provided in various embodiments. Typically, the pointer 260 points to a physical data block 242 in the PLB layer 240, thus associating the virtual block 150 with a physical block 242 and completing a path between a logical block 212 and a physical block 242. The physical block 242 is typically compressed, and the length 270 indicates a size of the compressed physical block.

The reference count field 166 maintains a count of elements that point to the virtual block 150, such as leaf pointers in the mapper 220 and in some cases other virtual blocks 150. Although FIG. 2 shows only a single leaf pointer pointing to each virtual block 150, deduplication activities conducted by the storage system 116 can cause multiple leaf pointers in the mapper 220 to point to a single virtual block 150. In addition, certain types of data consolidation can cause certain virtual blocks 150 to point to other virtual blocks 150.

Figure 3:
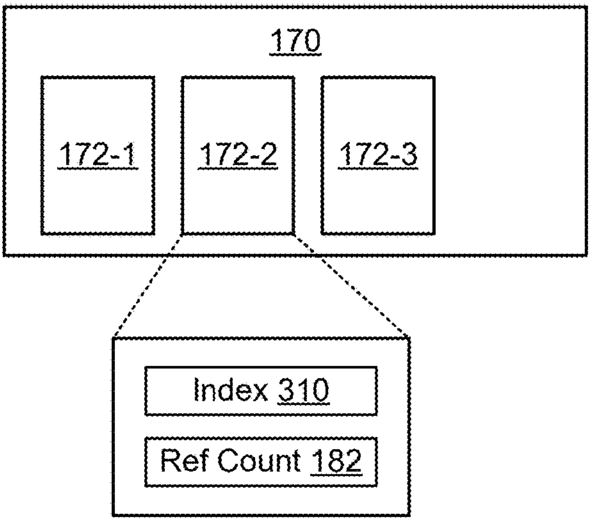
FIG. 3 is a block diagram of an example expansion region of FIG. 1 according to one or more embodiments.

FIG. 3 shows an example expansion region 170 in additional detail. Here, the expansion region 170 includes multiple records 172, i.e., records 172-1, 172-2, and 172-3. In an example, each of these records 172 stores the actual reference count 182 of a respective logical block 150, whose reference count field 166 has been set to the code 180 (FIG. 1).

As multiple records 172 may store reference counts for respective virtual blocks 150 in the same metadata page 142, a mechanism is provided for associating virtual blocks 150 with records 172. Various approaches are possible. In one example, records 172 are arranged in the same order as virtual blocks 150 in the associated page 142. For example, the first record 172-1 corresponds to the first virtual block 150 in page 142 that stores the code 180 in its reference-count field 166. Likewise, the second record 172-2 corresponds to the second virtual block 150 that stores the code 180, and the third record 172-3 corresponds to the third virtual block 150 that stores the code 180. The actual reference count 182 for a particular virtual block 150 can then be found by scanning the associated page 142 from the beginning and counting the number of virtual blocks having reference counts equal to the code 180, up to and including the particular virtual block. The associated record 172 may then be identified based on the count.

Another example is shown at the bottom of FIG. 3. Here, a record 172 stores two data elements, an index 310 and the actual reference count 182. The index 310 uniquely identifies the virtual block 150 based on its ordinal position within the page 142. For example, if the record 172-2 corresponds to the fifth virtual block 150 in the page 142, the index 310 may be set to five. The actual reference count 182 in record 172-2 would then contain the reference count of the fifth virtual block 150. These are merely examples provided for illustration and are not intended to be limiting.

In an example, the size of the expansion region 170 may be varied based on the number of records 172. In an example, each actual reference count 182 stored in a record 172 is 8 Bytes long (64 bits), allowing for enormous reference counts. Preferably, the minimum size of the expansion region 170 is one sector (512 Bytes). A typical maximum size of the expansion region 170 is 2 sectors (1024 Bytes), which is expected to be large enough to accommodate a different record 172 for each logical block 150 in a page 142. Larger expansion regions 170 may be provided, however, as applications require.

Figure 4:
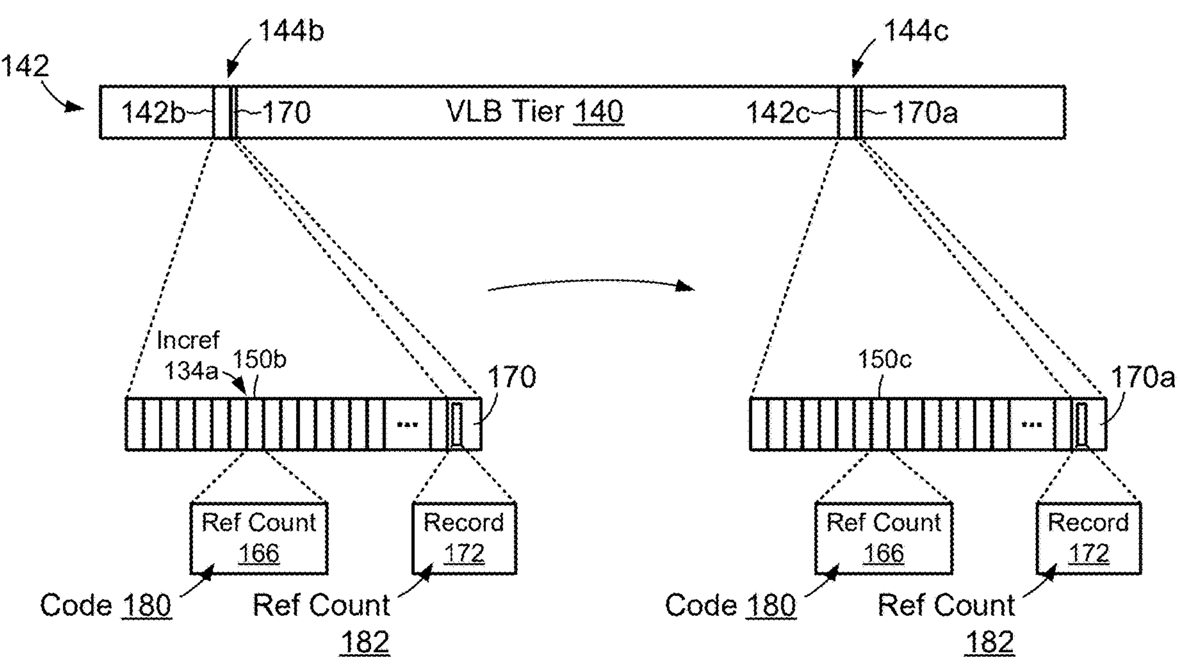
FIG. 4 is a block diagram of portions of the environment of FIG. 1 involved in responding to an incref, according to one or more embodiments.

FIG. 4 shows an example arrangement for responding to an additional (second) incref 134*a*, which now is directed to virtual block 150*b*, i.e., the same virtual block that was written in page 142*b* along with the expansion region 170 at the second persistent storage location 144*b* (FIG. 1). To process the incref 154*a*, node 120 reads both the metadata page 142*b* and the expansion region 170, preferably in one continuous read operation. For example, if the metadata page 142*b* is 4 kB long, the read operation may request 5 kB of data, which is enough to obtain both the page 142*b* and the associated expansion region 170. The read is preferably a read into memory, such as memory region 136, and preferably is not a read into cache 132. Node 120 modifies the page 142*b* and expansion region 170 in memory. In this example, the reference count field 166 of the virtual block 150*b* does not change and remains set to the code 180 (although other fields and/or other virtual blocks may change), but the expansion region 170 does change and reflects an increase of one. For example, if the actual reference count 182 stored in the expansion region 170 was 255 prior to processing the incref 134*a*, the actual reference count 182 is increased to 256. The new values of the page and expansion region are then written to page 150*c* and expansion region 170*a* at a third persistent storage location 144*c*. The location 144*c* is a distinct location from the locations 144*a* and 144*b*. The page 142*b* and the associated expansion region 170 may then be invalidated.

Figure 5:
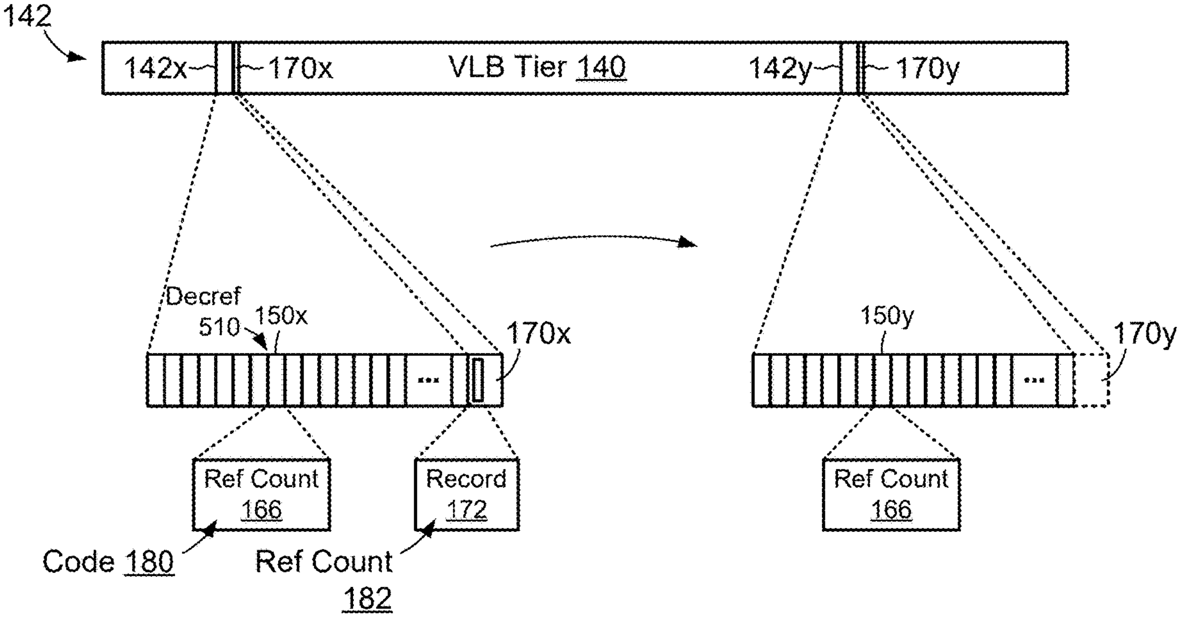
FIG. 5 is a block diagram of portions of the environment of FIG. 1 involved in responding to a decref, according to one or more embodiments.

FIG. 5 shows an example arrangement for responding to a decref 510. In this case, the decref 510 is directed to a virtual block 150*x*, which is part of a metadata page 142*x*. The metadata page 142*x* has an associated expansion region 170*x*. In this example, assume that the actual reference count 182 of the virtual block 150*x* stored in the expansion region 170*x* is set to 255 (the threshold value) and reference-count field 166 of the virtual block 150*x* is set to the code 180. To process the decref 510, node 120 checks the expansion region 170*x* and determines that decrementing the reference count 182 would cause it to fall below the threshold value. The node 120 then responds by writing a new version 150*y* of the virtual block in a new page 142*y*. The new version 150*y* stores the actual reference count (254) in the reference-count field 166 and either stores a new expansion region 170*y* from which the record 172 has been removed, or does not store any expansion region 170*y* if the removed record 172 was the only record present. In this latter case, no expansion region is stored and reference counting for all virtual blocks in the page 142*y* proceeds by storing all actual reference counts in the reference-count fields 166.

FIG. 6 shows an example redirection table 600 according to one or more embodiments. In an example, the redirection table 600 enables reference-count updates, i.e., increfs and decrefs, to be performed in system memory without requiring metadata pages 142 to be loaded into cache 132. As shown, the redirection table 600 associates source virtual blocks 610 with corresponding destination virtual blocks 620 to which the source virtual blocks 610 will be redirected. For example, node 120 builds the redirection table 600 when performing late deduplication, i.e., deduplication that takes place in the background, after duplicate copies of data have already been stored. To this end, the source virtual blocks 610 are those which deduplication will eliminate, leaving only the corresponding destination virtual blocks 620 in place.

As deduplication will eventually remove the source virtual blocks 610, any increfs or decrefs directed to source virtual blocks 610 should be redirected to the corresponding destination virtual blocks 620, which will remain after the source virtual blocks 610 are eliminated. For example, assume that an incref is directed to a particular virtual block, referred to herein as a “second” virtual block. Prior to updating the second virtual block, node 120 first performs a lookup for the second virtual block from among the source virtual blocks 610 listed in the redirection table 600. If the lookup produces a match to a source virtual block 610 already listed in the redirection table 600, node 120 redirects the incref to the destination virtual block 620 associated with the matching source virtual block 610. The incref is then performed on the indicated destination virtual block but not on the second virtual block. The redirection table 600 thus provides a convenient mechanism for tracking redirections, obviating the need for keeping virtual blocks 150 in cache 132 and enabling the node 120 to modify virtual blocks in memory. In an example, the redirection table 600 is implemented as a hash table, with the key being a hashed address of a source virtual block and the resulting value being an address of the corresponding destination virtual block.

FIG. 7 shows an example method 700 that may be carried out in connection with the environment 100. The method 700 is typically performed, for example, by the software constructs described in connection with FIG. 1, which reside in the memory 130 of a node 120 and are run by the set of processors 124. The various acts of method 700 may be ordered in any suitable way. Accordingly, embodiments may be constructed in which acts are performed in orders different from that illustrated, which may include performing some acts simultaneously.

At 710, a virtual block 150 is provided. The virtual block 150 has a fixed-length reference-count field 166 configured to store a reference count. The reference count indicates a number of pointers that point to the virtual block 150, such as leaf pointers in the mapper 220 and/or pointers in other virtual blocks 150.

At 720, an incref (reference-count increment) 134 is created. For example, the incref 134 is created pursuant to a deduplication operation, which itself may be performed as part of an x-copy operation 118. The incref 134 is directed to the virtual block 150. For instance, the virtual block 150 is the target of the deduplication operation, and the incref 134 indicates that one extra pointer now points to the virtual block 150.

At 730, an update operation is performed in response to the incref 134 causing the reference count of the virtual block 150 to increase to a threshold value, such as a maximum storable value in the reference-count field 166. Performing the update operation includes writing the threshold value to an expansion region 170 separate from the virtual block 150 and storing a code 180 in the reference-count field 166. The code 180 indicates that an actual reference count 182 of the virtual block 150 is now stored the expansion region 170. As the virtual block 150 becomes the target of additional increfs, the actual reference count 182 in the expansion region increases while the code 180 in the reference-count field 166 remains in place.

Method 700 avoids the need for storing duplicates of virtual blocks 150 for accommodating large reference counts, thus avoiding complexity and saving storage space, particularly in the VLB tier 140. Method 700 also avoids the need for infinite reference counts, which can reduce the system's storage capacity. In addition, method 700 enables reference-count updates to be performed outside of cache 132, avoiding delays and cache pollution, which would otherwise result from loading seldomly-accessed metadata pages 150 for virtual blocks into cache 132.

In some examples, the method 700 may be embodied as a computer program product including one or more non-transient, computer-readable storage media 750, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines and may be transportable from one machine to another.

Having described certain embodiments, numerous alternative embodiments or variations can be made. For example, although expansion regions 170 have been described above as being provided on a per page 142 basis, this is merely an example. Other examples may provide expansion regions 170 on a different basis, such as per multiple metadata pages, or per virtual block.

Also, although embodiments have been described which involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Further, although the term "user" as used herein may refer to a human being, the term is also intended to cover non-human entities, such as robots, bots, and other computer-implemented programs and technologies. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing reference counts of virtual blocks, comprising:

providing a virtual block having a fixed-length reference-count field configured to store a reference count, the reference count indicating a number of pointers that point to the virtual block;

creating an incref (reference-count increment) directed to the virtual block; and in response to the incref causing the reference count of the virtual block to increase to a threshold value, performing an update operation, the update operation including writing the threshold value to an expansion region separate from the virtual block and storing a code in the reference-count field, the code indicating that an actual reference count of the virtual block is stored in the expansion region.

2. The method of claim 1, wherein the virtual block is stored in a metadata page having a first persistent storage location, and wherein performing the update operation includes (i) reading the metadata page from the first persistent storage location into a region of memory, (ii) modifying the metadata page in the region of memory to provide the code in the reference-count field, and (iii) writing the metadata page and the expansion region adjacently at a second persistent storage location distinct from the first persistent storage location.

3. The method of claim 2, wherein the method is performed in a computerized apparatus that includes a cache configured to store a plurality of recently-accessed metadata pages, wherein creating the incref is performed as part of an x-copy operation, and wherein the region of memory in which the metadata page is modified is not disposed within the cache.

4. The method of claim 2, wherein writing the threshold value to the expansion region includes writing the threshold value to a first record in the expansion region, and wherein the expansion region includes at least one additional record that records at least one additional actual reference count for at least one additional virtual block stored in the metadata page.

5. The method of claim 4, wherein the expansion region has a size that is one of (i) 512 bytes long or (ii) 1024 bytes long.

6. The method of claim 2, further comprising:

creating a second incref directed to the virtual block; and performing a second update operation, the second update operation including (i) reading, in a single continuous operation, the metadata page and the expansion region from the second persistent storage location, (ii) modifying the expansion region in memory to account for the second incref, and (iii) writing the metadata page and the expansion region adjacently at a third persistent storage location distinct from the first persistent storage location and the second persistent storage location.

7. The method of claim 2, further comprising:

creating a decref (reference-count decrement) directed to the virtual block; and in response to the decref causing the reference count of the virtual block to decrease to a reduced count that is less than the threshold value, (i) storing the reduced count in the fixed-length reference-count field and (ii) removing a record provided for the threshold value from the expansion region.

8. The method of claim 7, further comprising removing the expansion region responsive to the expansion region no longer containing any records.

9. The method of claim 2 wherein, prior to performing the update operation, the method further comprises:

performing a lookup of the virtual block in a redirection table that associates source virtual blocks with destination virtual blocks; and proceeding to perform the update operation in response to the redirection table failing to identify a destination virtual block corresponding to the virtual block.

10. The method of claim 2 wherein, further comprising:

creating an incref directed to a second virtual block;

performing a lookup of the second virtual block in a redirection table that associates source virtual blocks with destination virtual blocks; and in response to the redirection table identifying a destination virtual block corresponding to the second virtual block, performing a reference-count update on the destination virtual block but not on the second virtual block.

11. A computerized apparatus, comprising control circuitry that includes a set of processors coupled to memory, the control circuitry constructed and arranged to:

provide a virtual block having a fixed-length reference-count field configured to store a reference count, the reference count indicating a number of pointers that point to the virtual block;

create an incref (reference-count increment) directed to the virtual block; and in response to the incref causing the reference count of the virtual block to increase to a threshold value, perform an update operation, the update operation including writing the threshold value to an expansion region separate from the virtual block and storing a code in the reference-count field, the code indicating that an actual reference count of the virtual block is stored in the expansion region.

12. A computer program product including a set of non-transitory, computer-readable media having instructions which, when executed by control circuitry of a computerized apparatus, cause the computerized apparatus to perform a method of managing reference counts of virtual blocks, the method comprising:

providing a virtual block having a fixed-length reference-count field configured to store a reference count, the reference count indicating a number of pointers that point to the virtual block;

creating an incref (reference-count increment) directed to the virtual block; and in response to the incref causing the reference count of the virtual block to increase to a threshold value, performing an update operation, the update operation including writing the threshold value to an expansion region separate from the virtual block and storing a code in the reference-count field, the code indicating that an actual reference count of the virtual block is stored in the expansion region.

13. The computer program product of claim 12, wherein the virtual block is stored in a metadata page having a first persistent storage location, and wherein performing the update operation includes (i) reading the metadata page from the first persistent storage location into a region of memory, (ii) modifying the metadata page in the region of memory to provide the code in the reference-count field, and (iii) writing the metadata page and the expansion region adjacently at a second persistent storage location distinct from the first persistent storage location.

14. The computer program product of claim 13, wherein the method is performed in a computerized apparatus that includes a cache configured to store a plurality of recently-accessed metadata pages, wherein creating the incref is performed as part of an x-copy operation, and wherein the region of memory in which the metadata page is modified is not disposed within the cache.

15. The computer program product of claim 13, wherein writing the threshold value to the expansion region includes writing the threshold value to a first record in the expansion region, and wherein the expansion region includes at least one additional record that records at least one additional actual reference count for at least one additional virtual block stored in the metadata page.

16. The computer program product of claim 13, wherein the method further comprises:

creating a second incref directed to the virtual block; and performing a second update operation, the second update operation including (i) reading, in a single continuous operation, the metadata page and the expansion region from the second persistent storage location, (ii) modifying the expansion region in memory to account for the second incref, and (iii) writing the metadata page and the expansion region adjacently at a third persistent storage location distinct from the first persistent storage location and the second persistent storage location.

17. The computer program product of claim 13, wherein the method further comprises:

creating a decref (reference-count decrement) directed to the virtual block; and in response to the decref causing the reference count of the virtual block to decrease to a reduced count that is less than the threshold value, (i) storing the reduced count in the fixed-length reference-count field and (ii) removing a record provided for the threshold value from the expansion region.

18. The computer program product of claim 17, wherein the method further comprises removing the expansion region responsive to the expansion region no longer containing any records.

19. The computer program product of claim 13 wherein, prior to performing the update operation, the method further comprises:

performing a lookup of the virtual block in a redirection table that associates source virtual blocks with destination virtual blocks; and proceeding to perform the update operation in response to the redirection table failing to identify a destination virtual block corresponding to the virtual block.

20. The computer program product of claim 13 wherein, wherein the method further comprises:

creating an incref directed to a second virtual block;

performing a lookup of the second virtual block in a redirection table that associates source virtual blocks with destination virtual blocks; and in response to the redirection table identifying a destination virtual block corresponding to the second virtual block, performing a reference-count update on the destination virtual block but not on the second virtual block.

* * * * *